United States Patent Office
3,210,733
Patented Oct. 5, 1965

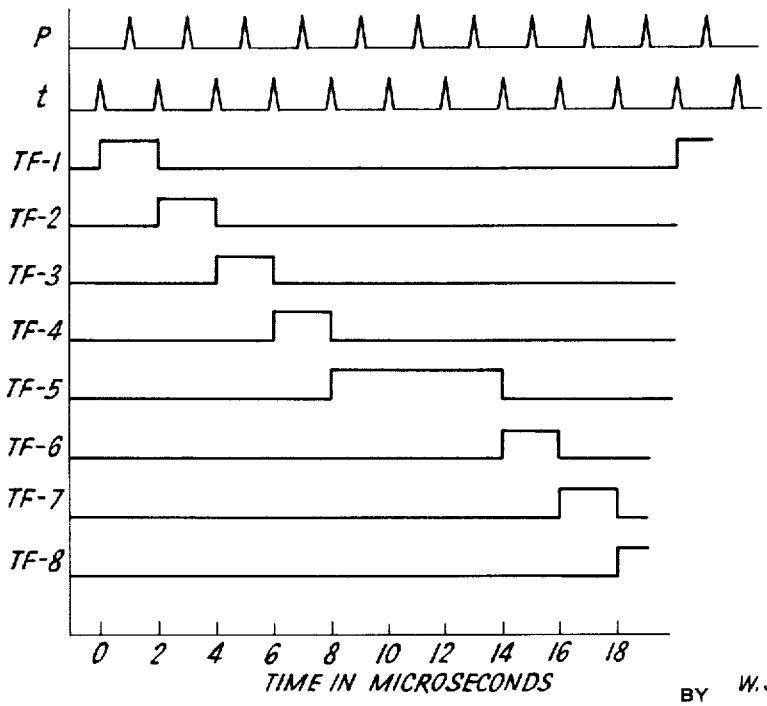

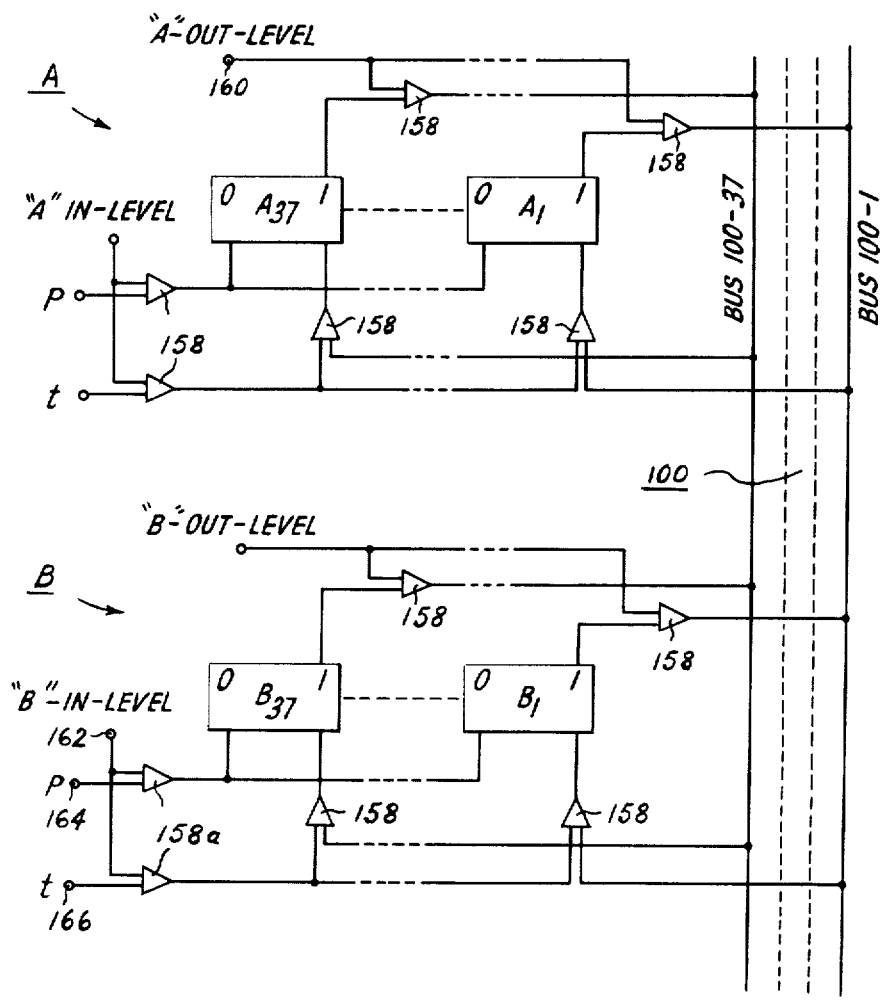

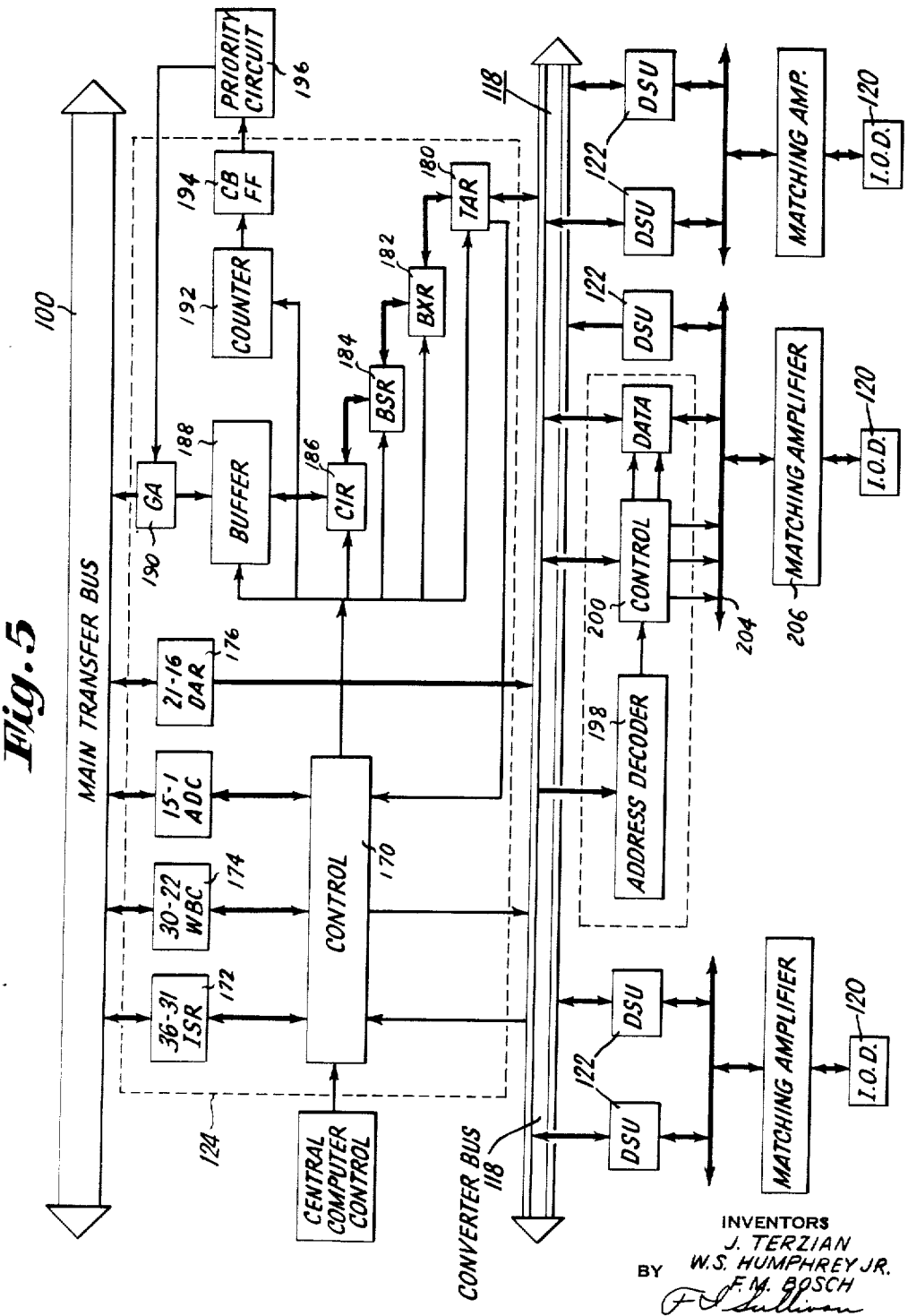

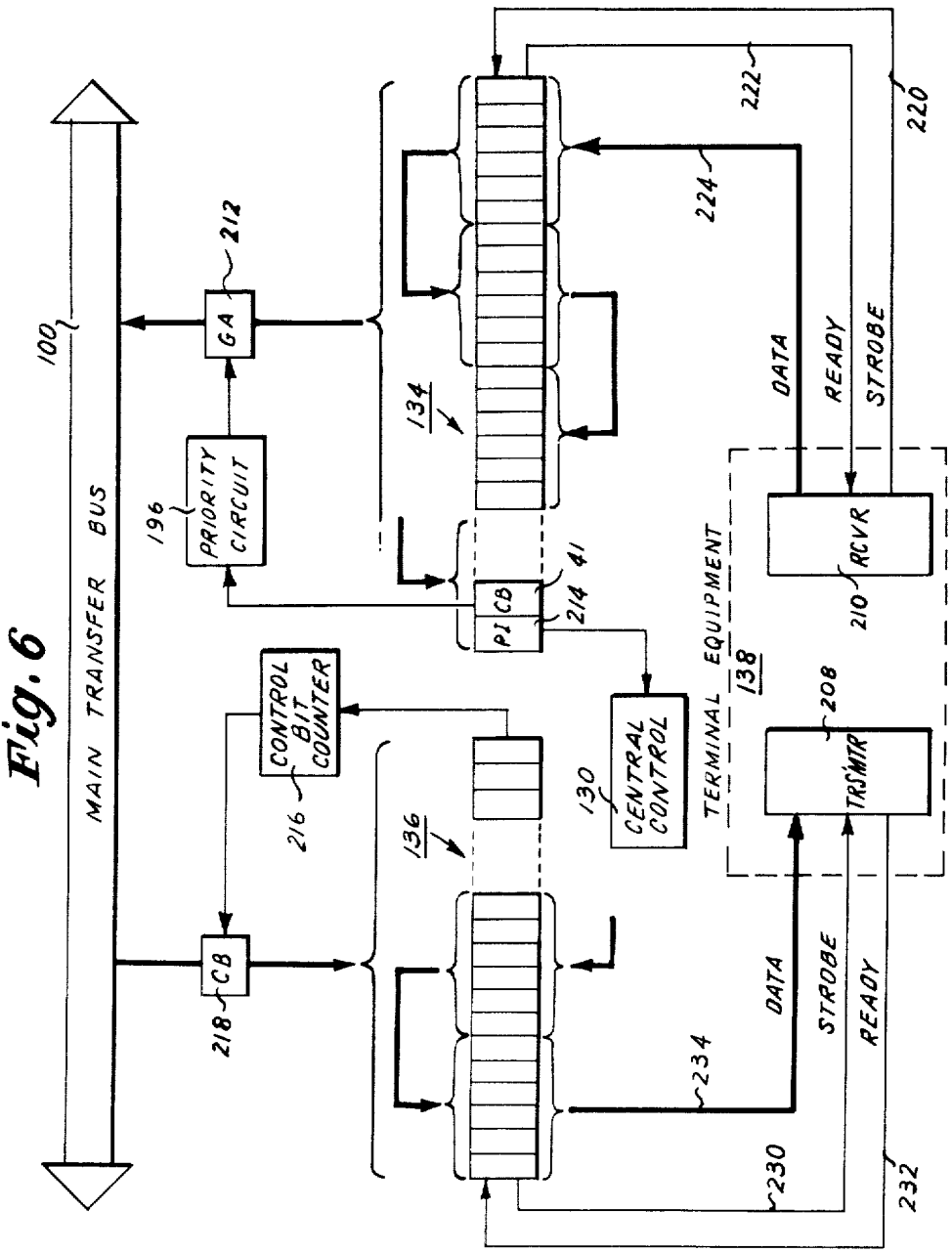

3,210,733
DATA PROCESSING SYSTEM
John Terzian, Woburn, Watts S. Humphrey, Jr., Cochituate, and Franz M. Bosch, North Billerica, Mass., assignors, by mesne assignments, to Sylvania Electric Products Inc., Wilmington, Del., a corporation of Delaware
Filed Aug. 18, 1958, Ser. No. 755,566
14 Claims. (Cl. 340—172.5)

This invention is concerned with data processing equipment and, particularly, with computers and their input-output devices. It is related to the system discclosed in copending U.S. Patent application Serial No. 755,565, filed August 18, 1958, by John Terzian, now Patent No. 3,061,192, entitled "Data Processing System."

One of the major concerns in the design of data processing equipments is their input-output system, which is the means whereby information, program routines, etc., are processed into the central machine and the final results in the form of information, displays, recorded data, monitored controls, etc., are extracted from it. If the central machine is to enjoy any kind of general purpose capability it must be able to handle at variety of programs calling for different types of input-output equipments such as magnetic tapes and drums, printers, display units, card translators, etc., and different numbers of each type to accommodate different problems and situations. The optimum design is that which: (1) provides effective control over the maximum number of devices; and, (2) has the ability to operate as many devices simultaneously as the central machine can handle.

A recent approach to accomplishing this purpose has been to organize an input-output system around a number of control centers each operating a plurality of separate devices. The central machine works one or a number of control centers, and each control in turn works one of its satellite devices, in response to the dictates of programmed instructions.

This type of system permits each control center to operate, selectively, any one of a variety, in types and numbers, of devices, and also provides for simultaneous operation of controls, each with an associated device, up to the limit of the data handling capacity of the central machine. It is, however, expensive in the overall number of separate devices which must be included in the system to provide it with the capacity for operating with the maximum number possible of both fast and slow data rate devices in accordance with the requirements of a variety of programs of different nature. It also makes heavy demands upon and considerably increases programming instructions and control connections because the central machine must follow the procedure of addressing each control center and in addition sub-addressing each desired device in order to accomplish an input-output instruction. Moreover, it has the serious limitation that two devices assigned to the same control cannot be operated simultaneously.

Accordingly, a primary objective of the present invention is to provide, for data processing equipment, an input-output system which will connect the maximum usable number of input-output devices to the central machine with a minimum of circuitry and programming requirements. Another objective is to provide a mulitplexing, as distinguished from a control center, capability for using available devices in different combinations for different problems. Still further objectives are to provide an improved input-output technique and an improved overall data processing system compatible with such an input-output improvement.

In one embodiment of the invention, these and related objectives are accomplished in a computer system which features an arrangement wherein all of the main components including memory units, internal registers, arithmetic units, etc. are connected to a main transfer bus, and the input-output system comprises a plurality of independent input-output devices each connected through an appropriate switching unit to an input-output converter bus which is in turn connected to the main transfer bus through a plurality of separate converter units. Each of these converters is capable of working with any one of the input-output devices in a multiplexing arrangement, and further devices may be added to the system by connecting them to the converter bus without any significant modification of the other components of the system. Also, the individual input-output devices are addressable directly from the central machine, and are automatically assigned the first available converter without requiring special program instructions or elaborate addressing and control connections.

Thus the invention provides an improved data processing system, and an input-output arrangement which is extremely flexible and readily expandable, with any converter capable of operating with any device as distinguished from other systems having a number of control centers each inflexibly limited to one at a time operation within its own captive family of devices.

Other objectives and features of the invention will be apparent from the following description and reference to the accompanying drawings, in which:

FIG. 2 is a diagrammatic representation of the data word processed in the computer of FIG. 1;

FIG. 3 is a diagram of the timing pulses of the computer of FIG. 1;

FIG. 4 is a diagrammatic representation of a representative portion of the pulse transfer mechanism of the computer;

FIG. 5 is a block diagram of the input-output system of the computer; and,

FIG. 6 is a block diagram of its real time system.

Figure 1:
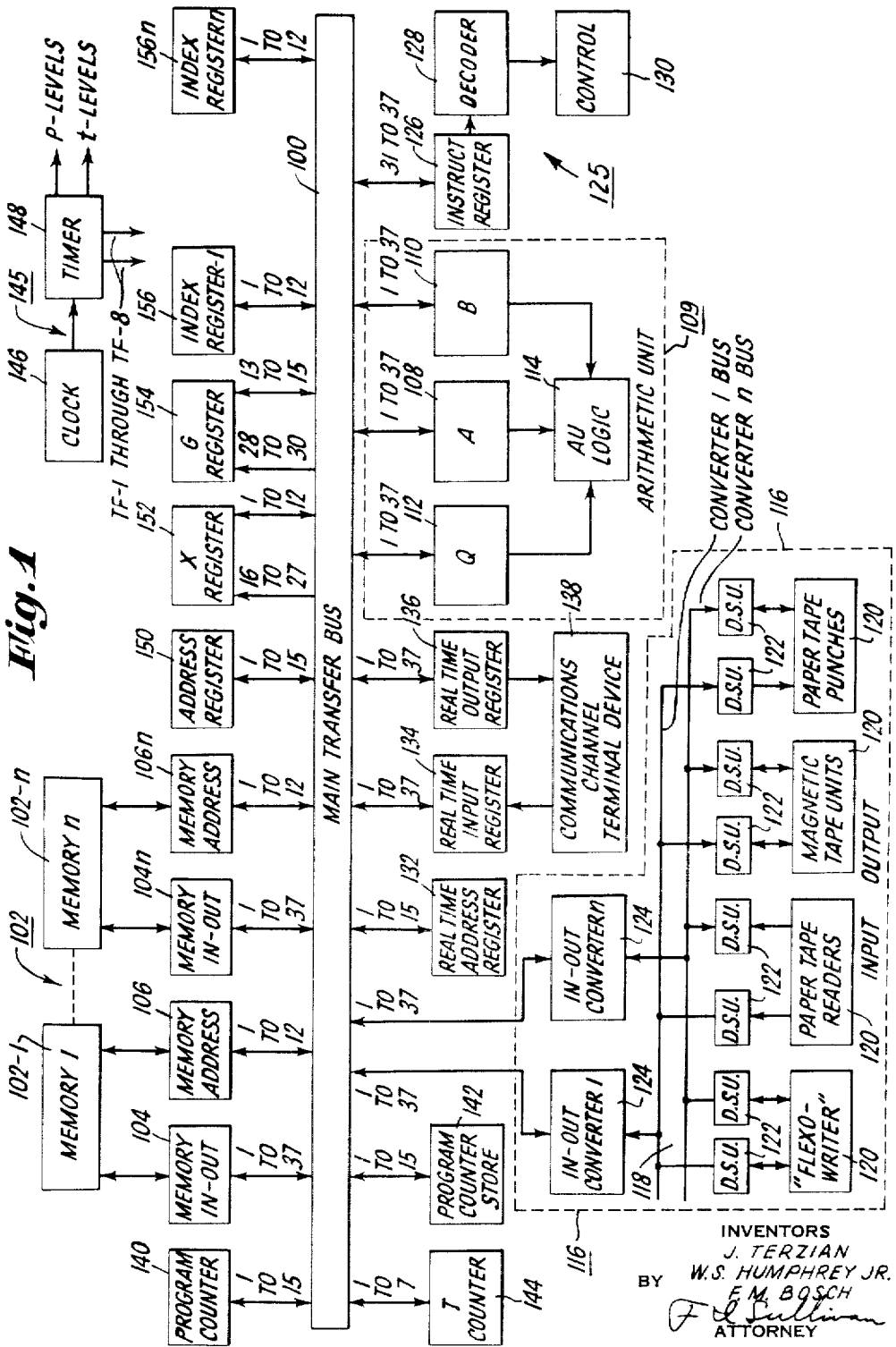
FIG. 1 is a block diagram of a computer system embodying the invention.

The computer diagrammed in FIG. 1 is a high speed digital equipment adapted to process data in the form of a binary word such as the thirty-eight digit example shown in FIG. 2.

All of the components of this computer are connected to a Main Transfer Bus 100 which comprises a separate conductor for each one of the thirty-seven information bits of the data word, the thirty-eighth being a parity digit which is not transmitted over the Main Bus. The principal components so connected include: a Memory System 102 having a plurality of Memory Units 102–1 etc,. each of which is connected to the bus 100 via a Memory In-Out Buffer 104 and a Memory Address Register 106; an Arithmetic Unit 109 comprising an A Register 108, a B Register 110, a Q Register 112, and a Logic Control Unit 114; an Input-Output System 116 comprising an Input-Output Converter Bus 118, to which are connected a number of Input-Output Devices 120 via Device Switching Units (DSU) 122, with each separate line of the Converter Bus 118 connected to the Main Transfer Bus 100 via an In-Out Converter 124; a Control System 125, including an Instruction Register 126, a Decoder 128, and a Control Unit 130; a Real Time System, including a Real Time Address Register 132, an Input Register 134, an Output Register 136, and a Real Time Terminal Device 138 such as a communications channel terminal equipment; a Program Counter 140, and a Program Counter Store 142; a T Counter 144, which functions as part of the Control System 125; a Timing System 145, including a Clock 146 and a Timer 148; and, a plurality of Internal Registers such as an Address Register 150, an X Register 152, a G Register 154, and Index Registers 156.

GENERAL DESCRIPTION

The operation of the computing mechanism under description is principally concerned with the following functions:

(1) Transferring to memory an overall operation control program in the form of a sequence of specific instructions along with the data to be processed. These instructions and data are in the form of separate multi-bit data processing words and enter the central machine over the Main Transfer Bus 100, via the Input-Output and Real Time Systems. Each word is stored in a separate address in memory.

(2) Calling the program, an instruction at a time, from memory.

(3) Adjusting each instruction, as required, and transferred its operand from an individual address in the memory to the Arithmetic Unit.

(4) Decoding the instruction.

(5) Executing the instruction.

These functions are performed by the equipment, and in the manner explained below.

MORE DETAILED DESCRIPTION OF COMPONENTS AND OPERATIONS

Main transfer bus

The Main Transfer Bus 100 is comprised of thirty-seven conductors, one corresponding to each digit (except parity) of the Word Format thereby providing a common parallel connection amongst all the internal registers of the system. In order to prevent ringing and cross-talk each conductor comprises a coaxial cable. This bus system greatly facilitates flexibility and expandability of the machine since further components such as additional memories, index registers, display devices, etc. can be added with little or no modification to the central machine or other components. It also facilitates the ability to address all Internal Registers as if they were locations in memory.

Memory

*Memory units.*—Each Memory System 102 may comprise a high speed magnetic Core Memory Unit 102-1 etc. having, for example, a total capacity of 4096 thirty-seven bindary bit words plus a parity digit for each word. The computer is so organized that memory capacity can be expanded by increasing the number of Memory Systems 102 connected to the Main Transfer Bus 100. Copending U.S. patent applications Serial Nos. 679,967 of August 23, 1957, and 727,602 of April 10, 1958, may be consulted for detailed description of a suitable memory system and auxiliary memory registers.

*Auxiliary memory registers.*—When a read pulse is applied to a Memory System 102 from the Control System 125, the contents of the memory location specified by the Memory Address Register 106 are extracted from memory and transferred to the Memory In-Out Register 104 which acts as a buffer for data being written into or read out of its associated Memory Unit 102-1 etc. Conversely, when a write pulse is applied, the contents of the Memory In-Out Register 104 are transferred to storage in the memory location specified by the Memory Address Register 106. Both of these Memory System auxiliary registers may be conventional flip-flop multi-bit storage devices of the sort described in the patent applications reference above and constructed to satisfy the functional requirements indicated below.

In the system under description, and working with the data word of FIG. 2, the Memory In-Out Register 104 may be a thirty-eight bit storage register connected in parallel as a buffer between the sense amplifier outputs of the Memory Units 102-1 etc. and the Main Transfer Bus 100 which, in turn, connects it to every other location in the computer. The thirty-eighth stage of this register is not connected to the Main Bus 100 but, instead, it is connected to all of the other thirty-seven stages to provide a parity digit. The following control lines are connected from the Control Center 125 to the Memory In-Out Register 104: clear, transfer out to bus, transfer in from bus, and, set from sense amplifiers (which comprise the output from the various memory locations). The operation of these lines is explained below under the headings Control System and Transfer Operation.

The Memory Address Register 106 may, in the present system, be a conventional twelve bit flip-flop register. It has, as described in the above-reference patent applications, the ability to specify the address of any one of the internal addresses of the particular Memory Unit 102-1 etc., with which it is associated by proper setting of its component flip-flop stages. Each Memory Address Register 106 receives its input from the central computer Address Register 150, the Real Time Address Register 132, etc., via gated connection to the Main Transfer Bus 100, and its outputs energize the appropriate lines of a diode decoder to select the particular coordinate conductors of the memory matrix which define the address in memory into which data is to be written or from which it is to be read to the internal selection circuits of its associated Memory Unit 102-1 etc. Its connections to the Central Control System 125 include: clear; and transfer in from bus. The maner in which this register and its control connections operate will be explained, subsequently, in the course of describing a typical addition operation of the machine.

Arithmetic unit

The Arithmetic Unit 109 is that section of the computer where the actual arithmetic and logical operations of the program are implemented. The structure and operation of this unit is explained in detail with reference to illustrative examples in copending U.S. patent application Ser. No. 755,565, now Patent No. 3,061,192, filed concurrently with this specification and also assigned to Sylvania Electric Products Inc.

*A Register.*—The A Register 108, or Accumulator, may be considered the main register of the Arithmetic Unit. Most of the arithmetic or logical operations that the computer performs involve either the existing contents of this register or quantities which are processed through it before they are operated upon. In the four basic arithmetic operations, Add, Subtract, Multiply and Divide, the A Register holds, respectively, the sum, difference, product, and remainder, resulting from the specific operation. At the beginning of the operations Add or Subtract, it holds the augend and minuend, respectively.

This A Register is basically a thirty-seven stage pulse shifting register of the accumulator type with appropriate control circuit connections to enable it to: clear; transfer in or out to Bus 100; add to its own contents the contents of the B Register 110 for the performance of various arithmetic operations; complement; shift left or right; etc.

*B Register.*—The B Register 110 is basically a thirty-seven bit storage register for holding one of the operands of the arithmetic operations. In the four basic arithmetic processes it holds respectively the addend, subtrahend, multiplicand, and divisor. It also has associated control circuitry for performing: clear; complement; and, transfer in from, or out to, bus operations. For example, to perform subtraction, the B Register 110 complements the subtrahend and adds the result to the contents of the A Register 108. Its function in other arithmetic and logic operations will be discussed below under the heading Control System.

*Q Register.*—The Q Register 112, also known as the Multiplier-Quotent Register, is an auxiliary device of the Arithmetic Unit 109. It is a thirty-seven stage shift register which finds primary use in the multiplication and division operations. During these processes, it holds the multiplier, low order bits of a double-length product or dividend, and the quotient. It can also be joined with the A Register 108 for double-length shift and cycle operations. This is accomplished by gating into operative condition a connection between the least significant stage of the A Register and the most significant stage of the Q Register. Its control connections permit it to: clear; shift right or left; and transfer to or from bus.

*Arithmetic-Logic unit.*—The Arithmetic-Logic, or Control, Unit 114 contains the circuitry such as the carry chain, etc. required to implement the arithmetic and logic operations that occur in the three principal registers (A, B, and Q) of the Arithmetic Unit 109. The manner in which this unit functions in the various arithmetic operations of the machine will be described below in the discussion of the Control System.

Program counting

*Program counter.*—The Program Counter 140 is a fifteen stage counter circuit that holds the address of the next instruction of the program to be extracted from memory. It is arranged to step automatically and sequentially through all of the memory locations in which the program which dictates the operations of the computer is stored. Its control connections include: clear; transfer to or from bus; and, count.

The first twelve bits of this fifteen bit counter are used to identify the specific addresses within a Memory Unit 102–1 etc. where the particular program instruction concerned is located. The remaining three bits specify which of the Memory Systems 102 is being addressed, and also activate an alarm if a non-existent memory address is transferred into the counter. The availability of three bits for designation of a Memory System 102 limits to eight the maximum number of memories workable with the particular equipment under description.

*Program counter store.*—The Program Counter Store 142 is a fifteen bit register which provides temporary storage for the contents of the Program Counter 140 when control is transferred to a sub-routine program by an appropriate instruction and the Counter 140 is processing the addresses of the sub-routine. At the end of the sub-routine, another appropriate instruction returns control automatically to the main program by transferring the contents of the Program Counter Store 142 to the Counter 140. Its control connections include: clear; transfer in from bus; and transfer out to bus.

Word format and internal registers

*Word format.*—The data word processed by the computer is composed of thirty-eight binary bits. As shown in FIG. 2, these bits are grouped in accordance with four different formats depending upon whether the word is representing: Binary Data; Alpha-Numeric Data; Standard Instructions; or, In-Out Instructions.

*Binary data.*—As shown in FIG. 2–A, Binary Data is represented using a fixed point magnitude and sign combination. The magnitude of a number is represented in binary code by bits one through thirty-six. The binary point is understood to be placed between bits thirty-six and thirty-seven, and the thirty-seventh bit represents the sign of the number, e.g. positive quantities are represented by zero and negative by one. Bit number thirty-eight provides a parity check. This check is "odd" in the system under discussion.

*Alpha-Numeric Data.*—FIG. 2–B demonstrates that the format for Alpha-Numeric Data is the same as for binary data except that the sign bit is eliminated. A specialized code is employed wherein any alpha-numeric quantity may be expressed by an individual combination of six binary bits. Thus, bits one through thirty-six can be used to represent any combination of six alpha-numeric characters. Although this computer functions as a binary machine, it is possible to perform logical operations, such as comparison, directly on alpha-numeric data in this word format without extra conversion to a numerical value.

*Standard Instruction.*—FIG. 2–C shows a Standard Instruction divided into: Alpha, Beta, and Gamma Addresses; an Operational Code; a Spare Bit (number thirty-seven); and, a Parity Check Bit (number thirty-eight).

The Alpha Address comprises bits one through fifteen. This specifies the address in memory in which the data to be used in the performance of an instruction is located. Of these fifteen bits, the first twelve identify a specific location in a Memory unit 102–1 etc., and bits thirteen through fifteen specify which of the Memory Systems 1–$n$ is to be used. Also, one of the possible combinations of bits thirteen through fifteen is used to indicate that one of the Internal Registers 150–156 is to be used to modify the instruction. The actual register concerned is specified by an individual combination of bits one through five.

Bits sixteen through twenty-seven comprise the Beta Address. This is used for several different purposes, depending upon the instruction being performed. In one application, it may be loaded into or added to the contents of an Index Register 156; or, either alone or in combination with the Gamma Bits it may provide a second address for some instructions.

Bits twenty-eight through thirty comprise the Gamma address which is used primarily for indexing. This address specifies which, if any, of the Index Registers are to be used with the instruction. Also, as mentioned in the paragraph above, the Gamma Bits may be used in combination with the Beta Bits to form a second address for the instruction.

Bits thirty-one through thirty-six are referred to as the Operation Code and designate the operation which is to be performed by the computer upon the contents of the addresses specified by the alpha, beta, etc. bits.

*Input-Output Instructions.*—FIG. 2–D demonstrates that the Input-Output Instructions correspond to the Standard Instructions, with bits one through fifteen comprising an Alpha Address, bits thirty-one through thirty-six, the Operational Code, bit thirty-seven being a spare, and bit thirty-eight providing a parity check. The diffenece is that the Beta and Gamma Addresses have been replaced, respectively, by $j$ and $k$ subdivisions of the data word.

The $j$ group, which may include bits sixteen through twenty-one, specifies the particular Input-Output Device 120 addressed. Each of these devices has a specific address, and sixty-three separate units can be handled by the six bit $j$ address suggested.

The $k$ portion of the word may comprise bits twenty-two through thirty. It is used to specify the number of words, blocks, cards, lines, etc. to be processed by the Input-Output Device 120.

*Address Register.*—The Address Register 150 is a fifteen bit storage register which is used to hold the alpha portion of an Instruction Word prior to its transfer to an appropritate Memory Address Register 106. Since the specific location in memory or the identity of an addressable register whose contents are to be processed by the operation specified in the instruction is determined by the alpha digits, they are placed in this register 150 as an intermediate step before the execution of the instruction so that the address specified may be modified for relative addressing etc. For this purpose, the contents of a specified index register may be added to the contents of the Address Register via the Main Transfer Bus 100 in the manner indicated in connection with the explanation of the Instruction Word 2–C above.

Address Register 150, in the computer under description, may comprise fifteen stages or bits of storage. The first twelve of these comprise a memory or storage register address. The remaining three are used to provide an alarm indication if the contents of Register 150 do not indicate an existent memory location or Internal Register.

The control connections to the Address Register 150 are: clear; transfer to and from bus; and, add from bus.

*X Register.*—The X Register is a twelve bit storage device which is used to hold the beta portion of an instruction. In the system and with the Word Format under description, its twelve bits are connected to bus lines 16–27. For instructions which use the beta bits as part of a second address, however, this register connects to bus lines 1–12 in order to be able to correspond to the alpha address portion of an Instruction Word at the proper time. The X Register therefore has connections to two sets of bus lines, 1–12 and 16–27.

The control connections to the X Register include: a clear line; and two sets of bus transfer controls, one for transferring to and from the lower set of bus lines (1–12) and another for transfer to and from the higher set of bus lines (16–27).

*G Register.*—The G Register is a three bit storage device which holds the Gamma Bits of an instruction. The output of the G Register is used to determine Index Register selection and, in some cases, as part of a second address. For this purpose, the G Register 154, like the X Register 152, must have connections to two sets of bus lines. It may normally be connected to bus lines 28, 29, and 30; but, for addressing purposes, it can also be connected to bus lines 13, 14, and 15.

Its control circuits are the same as those associated with the X Register 152; i.e.: clear; transfer to and from high bus (28–30); and, transfer to and from low bus (13–15).

*Index Registers.*—Each of the Index Registers 156 is a twelve bit counter available for use in relative address or tallying iterations in program loops. In addition to being addressable in standard fashion over the Main Transfer Bus 100, these registers may have their contents modified by instructions such as: load index; transfer on index; add beta; subtract beta; transfer and load PCS (Program Counter Store); and, repeat.

When the Index Registers 156 are used for relative addressing, the contents of the particular Index Register specified by the gamma portion of an instruction will be placed upon the Main Transfer Bus 100. The Address Register 150, then, senses this information and adds it to the alpha address to form the relative address. When used for tallying, the desired number of interations is initially loaded into an Index Register 156. This number is periodically decreased under control of instructions such as: repeat; transfer on index; or, subtract beta, until the contents of the Index Register are equal to zero, at which time the iterative process being controlled is terminated.

The control connections to the Index Registers 156 are: clear; transfer out to bus; transfer in from bus; and, subtract one (i.e. count).

Control system

The Control System 125 directs and controls the operations of the computer in response to the dictates of the operating program. The principal components of this system are the Instruction Register 126, the Decoder 128, and the Control Circuits 130.

*Instruction register.*—The Instruction Register 126 is a seven bit storage device used to hold the six bit Operation Code portion of an instruction prior to transfer of these instruction bits to the decoder register. The seventh position presently holds the spare bit, number thirty-seven, and may be use for future expansion of the code. The principal function of this register is to provide temporary storage so that the instructions may be sensed to enable certain preliminary actions to occur before the decoding of the instruction commences in the Decoder 128. This is particularly useful in the execution of input and output instructions, where the availability of an addressed device must be determined before the instruction is executed.

The control connections to the Instruction Register include: clear; and, transfer to and from bus. It also may have one or more control lines which enables special instructions to be fed directly into the register.

*Decoder.*—The Decoder 128 contains a seven bit register which holds the instruction (plus spare bit) currently being executed by the computer. This decoder register derives its input through direct connection to the Instruction Register 126, and its output is permanently connected to a decoder network. It has no connections to the main transfer bus. Its control lines include: transfer in from instruction register; and, clear-halt. Clearing this register is the equivalent of halting the computer, since a condition of all zeros in the register constitutes a halting instruction.

The decoder circuit network may be any conventional logic tree or other decoder system adapted to select one or more specific output lines for any given combination of the six inputs derived from the decoder register.

*Control circuits.*—The Control Circuits 125 include the registers, circuits, etc., used in directing the acquisition, decoding, and execution of instructions, and in controlling and coordinating various other logical steps and operations required for proper functioning of the complete computer system. The logic of these circuits is implemented in a manner well known in the computer art in accordance with the laws of Boolean Algebra, and employing minimization techniques.

*T Counter.*—The T Counter 144 is a seven stage counting circuit that operates as an adjunct of the Control System. It is used to control shifting operations in the Arithmetic Unit 109, and for other purposes, e.g. executing multiply and divide orders, etc., which require a counting type of control. It also serves as a timer when one of the Timing Functions (TF–8) is extended in a manner explained below under the heading, Timing. Its control connections include: clear; transfer to or from bus; and, add or substract one, viz. to count up or down.

Timing

The basic components of the Timing Circuit are a Clock 146 and a Timer 148.

The Clock 146 may be comprised of a crystal controlled multivibrator providing a one megacycle square wave. In the Timer Circuit 148, this signal is converted to two 500 kc. square wave pulse trains designated $p$ and $t$ levels (FIG. 1), respectively. These $p$ and $t$ levels are phased 180° apart and distributed throughout the machine for synchronizing purposes. They are differentiated and converted to standard 0.1 microsecond $p$ and $t$ pulses, respectively (FIG. 3), by gated pulse generators located throughout the system within the racks and close to the circuits in which the pulses operate, thus preventing distortions, delays, mistimings, etc. due to transmission of clock and control pulses for lengthy and unequal distances throughout the system.

In addition to the $p$ and $t$ outputs, the Timer 148 provides eight additional outputs designated TF–1 through TF–8 in FIGS. 1 and 3. These outputs apply timed gating levels which are referred to as "Timing Functions" throughout the machine. As shown in FIG. 3, they identify the eight periods of a basic cycle which comprises the steps required by the computer for the execution of a single instruction in its program.

The leading and trailing edges of the timing functions are synchronized with the levels from the Timer 148, and the duration of each function is normally 2 microseconds in the system being described. In computer operations requiring basic cycles that are longer than 16 microseconds, however, the normal sequencing of the Timer 148 is temporarily interrupted by a $\gamma$ flip-flop in a manner which will be described below causing it to remain at one or another of the eight timing functions. In such cases, for example, multiplication and division, the selected Timing Function remains high until the prolonged excution is performed and normal sequencing is resumed. The stopping of the Timer does not, however, interrupt the generation of $p$ and $t$ sequencing pulses and they can be employed to permit the memory to work the Input-Output System etc. while computation is proceeding.

An example of an extended timing function is shown at TF–5 in FIG. 3. All sequencing of the Timer 148 to produce the Timing Functions TF–1—TF–8 is controlled by a flip-flop located in the Control Section 130 and referred to as $\lambda$. When ever the $\lambda$ flip-flop is set to zero, the Timer is stepped every 2 microseconds by successive $t$ pulses. When $\lambda$ is set to one, however, the $t$ pulses are blocked and sequencing of the Timing Function is interrupted until $\lambda$ is reset to zero. The states of $\lambda$ are controlled by gated $t$ and $p$ pulses within the Control Section 125 of the computer.

Transfer operation

From the block diagram of FIG. 1, it is apparent that all the major components of the computer system are connected to the Main Transfer Bus 100, over which all the information flow within the computer is processed. FIG. 4 illustrates how information is transferred between register locations over this bus. In the example shown, assume that information is to be transferred from Register A to Register B, each of these registers comprising flip-flops $A_{1-37}$ and $B_{1-37}$, respectively, with an appropriate system of AND gates 158 and voltage input and output terminals 160, 162, etc.

At the beginning of the period in which transfer is to occur, the A output voltage level at Terminal 160 and the B input voltage level at Terminal 162 are both raised. The individual transfer bus lines 1–37 will now be high or low depending upon the states of the corresponding stages of the A register connected to them. For example, if stages A–1 and A–37 are both representing a one, the voltage on both conductors 1 and 37 of the Main Transfer Bus 100 will be raised; and, if either or both stages represent a zero, a relatively low voltage will appear on their respective buses. After an appropriate period of time (e.g. 1 microsecond), with the approprate IN and OUT AND gates 158 energized by the A output and B input pulses, a $p$ pulse is introduced through Terminal 164 into the system. This $p$ pulse is gated through the B register Input AND Gate 158a to combine with the pulse at the B Input Terminal 162 and thereby clear the B register, i.e. set every stage to zero. At the next time interval (e.g. 1 microsecond later), a $t$ pulse arrives via Terminal 166 and sets to the one state all of the stages of the B register that are connected to the Main Transfer Bus lines 1–37 which have a high signal from the respective stages of the A register to which they are connected. The B register now contains the same data as the original contents of the A register, and transfer is complete. The voltage signals at the A Output Terminal 160 and the B Input Terminal 162 are thereupon lowered, causing both the A register and the B register to disconnect from the bus 100.

Input-output system

The input-output system of this computer is characterized by exceptional versatility and expandability, along with the faculty of controlling its own access to and from memory, as required, without the necessity of repetitive program instructions of an interrogatory nature. It also is capable of direct access to and from memory over the Main Transfer Bus 100 independently of the Arithmetic Unit 109, with the result that this Unit can proceed with computation while the Input-Output System is working a Memory System 102 or Internal Registers 150–156.

As shown in the block diagram of FIG. 1, the principal components of the Input-Output System include: a number of In-Out Converters 124; an In-Out Converter Bus 118; and, a variety of Input-Output Devices 120 each connected to the Converter Bus 118 by means of a separate Device Switching Unit (DSU) 122.

This system is capable of simultaneous operation of as many Input-Output Devices 120 as it has Converters 124 connected between the Main Transfer Bus 100 and the Input-Output Converter Bus 118. The maximum number of converters that the machine is capable of handling depends upon the data rates of the Input-Output Devices 120 that are to operate simultaneously. In a typical system, as many as eight Converters may be employed to operate selectively with as many as sixty-three Devices 120. This restriction is imposed on the illustrative system under description by the fact that the Input-Output Instruction Word has only six bits (21–16) available for device addressing, as has already been explained in connection with the preceding discussion of the system word format.

FIG. 5 shows in more detail than the block diagram of FIG. 1 the components of the input-output system. The Converter 124 is subdivided into a Control Unit 170 and a plurality of Instruction Word Registers including: an Instruction Storage Register (ISR) 172; a Word Block Counter (WBC) 174; a Device Address Register (DAR) 176; an Address Counter (ADC) 178; Auxiliary Buffer Registers (TAR) 180, (BXR) 182, (BSR) 184, (CIR) 186; and a Major Buffer Register 188. The transfer of characters from the Buffer Register 188 to the Main Transfer Bus 100 is controlled by a Gate Circuit (GA) 190 which is responsive to signals processed through: a Counter 192; a Control Bit Flip-flop 194; and, a Priority Circuit 196. Each of the Converter Systems is independently connectable to any selected input Output Device 120 in a manner which will be explained below.

*Control unit.*—The Control Unit 170 is not a physically integral device, but a collection of flip-flop circuits, AND, OR, and INHIBIT gates, etc. dispersed to appropriate locations throughout the machine where they sense logical conditions and then energize indicated control lines to transfer data, energize gates, etc. in accordance with the conditions sensed. The heavy lines leading to and from the Control Block 170 indicate control over multi-conductor channels of data flow, etc. The lighter lines indicate single conductor control to individual gates, etc. The operation of this control network will be more apparent from the following description of the component parts of the Input-Output System.

*Priority circuit.*—The Priority Circuit 196 is a combination of AND, OR, and INHIBIT gates which form a matrix having as an input the Control Bit flip-flops 194 and 41, respectively, in the various Converters 124 and the Real Time Input Register 134, and as an output the various Gate Circuits 190 and 212 which control the data flow to and from these subsystems. The operation of this matrix is gated by one of the timing functions in the basic cycle of the system. The Control Bits are automatically cleared when sensed, and the INHIBIT interconnections among them make it possible for any one to be energized as soon as the matrix is gated unless another of higher priority inhibits this effect until it is itself cleared.

*Instruction storage register.*—The Instruction Storage Register (ISR) 172, in combination with the Word Block Counter 174, the Device Address Register 176, and the Address Counter 178, comprises storage for the thirty-six bit Input-Output Instruction Word processed from the central machine to the Converter 124. It is a six bit storage register connected to conductors 31–36 of the Main Transfer Bus 100. Its function is to hold the Operation Code portion of the Input-Output Instruction Word described with reference to FIG. 2–D. This register is addressable directly from the Main Transfer Bus 100 in conjunction with its associate registers listed above. Its control connections include: transfer in from bus; transfer out to bus; and, clear.

*Word block counter.*—The Word Block Counter (WBC) 174 is a nine stage subtracting counter which specifies the number of words or blocks to be handled during an input-output operation. This counter is connected to conductors 22–30 of the Main Transfer Bus 100 and is addressable in conjunction with its associated Instruction Word Registers 172, 176, and 178. Its control connections provide for: subtract one; transfer in from bus; transfer out to bus; and, clear.

*Device address register.*—The Device Address Register (DAR) 176 is a six stage storage register connected to conductors 16–21 of the Main Transfer Bus 100. It contains the address of the selected Input-Output Device 120, and provides outputs to the device address lines of the Converter Bus 118. This register is also addressable in conjunction with the other converter Instruction Word Registers 172, 174, and 178, but can be modified only at the time of input-output converter selection. Consequently, the nature of the instructions pertinent to the operation of a particular Device 120 can be altered while the device itself is operating, and the Device Address Register 176 will hold central machine connection to the particular device concerned during the modification.

*Address counter register.*—The Address Counter Register (ADC) 178 specifies the address of a memory location or a register into which each word of a sequence is stored during an input instruction, or from which a word is taken during an output instruction. It comprises a fifteen bit counter, which at the start of an Input-Output instruction receives the address of the first memory location whence data is to be derived or into which it is to be stored. After each memory access its contents is augmented by one to provide a new working address.

This register is connected to conductors 1–15 of the Main Transfer Bus 100 and is addressable in conjunction with its associated Converter Instruction Word Registers 172–176. Its control connections include: transfer in from bus; transfer out to bus; clear; and, add one.

*Auxiliary buffer registers.*—The four Auxiliary Buffer Registers 180–186 are employed for the transfer of data from the Converter Bus 118 to the Main Buffer Register 188. These are six bit storage registers which are adapted to process alpha-numeric data a character at a time in accordance with the six digit binary coded word format explained with reference to FIG. 2–B above.

The TAR Register 180 which is proximate the Converter Bus 118, performs, through the medium of a control flip-flop, an auto-synchronizing function upon the asynchronous data coming off the bus 118. It also has connection with the Converter Control Unit 170 for sensing of special symbol digits such as block marks, etc. and for performing parity checks. The Intermediate Buffers BXR 182 and BSR 184 provide a delay for input data so that the machine may be capable of accommodating a plurality of Converters 124. The CIR Register 186 is similar to the TAR Register 180 in that it provides for sensing of special symbols and a parity check in addition to contributing to storage delay of data flowing from a Device 120 to the central machine. Such delay is required to accommodate simultaneous operation of two or more Devices.

The control connections for each of the Registers 180–186 include: transfer in; transfer out; and, clear.

*Main buffer register.*—The Main Converter Buffer 188 is a thirty-seven stage shift register which processes data to and from the CIR Register 186, six digits at a time, i.e. one complete alpha-numeric character of the code explained above under the heading Word Format, with reference to FIG. 2–B. It also shifts in six stage units so that six shifting operations introducing data from the Auxiliary Six Stage Buffer (CIR) 186 results in filling the thirty-six stages of the Buffer 188 with a complete word suitable for parallel transfer to the central machine over Main Transfer Bus 100. The thirty-seventh digit of Register 188 provides for a parity check. Buffer 188 is connected to the Main Transfer Bus 100 but is not directly addressable, due to its dependence upon Gate 190 to complete the connection. Its control connections include: transfer in from bus; transfer out to bus; transfer digits in from CIR; transfer digits out to CIR; and, clear.

*Auto-generated control of data transfer between Buffer and central machine.*—As mentioned previously in this description, a unique feature of this computer is the manner in which input data is processed into the central machine. The components which cooperate to accomplish this are the Converter Main Buffer 188 and associated Counter 192, Control Bit Flip-flop 194, Priority Circuit 196, and Gating Circuit 190. As explained above, the Auxiliary Buffer Registers 180–186 which are associated with the Buffer 188 accept the asynchronous data coming from an Input-Output Device 120 over the Converter Bus 118 six digits at a time, store it, and synchronize its flow. They also process this data, still six digits at a time, into the Buffer 188. After six transfers have been made from the CIR Register 186 to the Buffer 188 a complete thirty-six digit word has been assembled in the buffer for transfer over the Main Bus 100. The Counter Circuit 192, which is set to zero each time the Buffer 188 is cleared in preparation for the acceptance of a word, is pulsed each time a six bit transfer is made from the CIR Register 186 to the Buffer 188. After the sixth transfer the Counter 192 sets the Control Bit Flip-flop 194 which signals to the Priority Circuit 196 that the buffer associated with this particular control bit is ready for transfer of data to the central machine.

Priority Circuit 196 is connected to the Gate 190 which controls the flow of data between Buffer 188 and the Main Transfer Bus 100. It also has a similar input connection from each of the other Converters 124 in the system and the Real Time Input Registers 134, and is constantly cycling through and sensing each of these inputs. When any of them indicates that input or other data is ready for transfer into the central machine, the Priority Circuit signals the Central Control 130 to stop the operation of the central machine upon completion of the current instruction so that the data may be accepted. This is accomplished by the central control sensing a signal connection to the Priority Circuit as an ancillary step of its basic cycle. The Central Control 130 also automatically surrenders control to the Priority Circuit for transfer of input-output data over the Main Bus 100 during the execution of relatively lengthy operations, such as multiply and divide, by the Arithmetic Unit 109.

Once the Priority Circuit 196 takes over control, it cycles through its input connections on a priority basis to transfer data from the various Converter Buffers 188 and Real Time Input Registers 134 to memory locations and addressable Internal Registers of the central machine. The sequence in which the priority circuit works its satellite input-output devices is determined by an assigned cycle which is established by the permanent wiring of the control system of the machine.

*Converter bus system.*—The Converter Bus 118 connects each Converter 124 with all of the Input-Output Devices 120 in the system. In the particular system under description, the bus 118 consists of aseparate combination of twenty-two line conductors for each of the converters used. Six of these lines (17–22) are used for selective addressing of Input-Output Devices 120. Eight lines (9–16) are used for data transfer; and eight lines (1–8), are used for control purposes. The functioning of this bus will be apparent from the detailed description below of the operation of the Converters 124 and the Device Switching Units 122.

*Device switching units.*—A separate Device switching Unit 122 controls the flow of information between each Converter 124 and each Input-Output Device 120. Consequently, each Device 120 must have as many Switching Units 122 as there are Converters 124 employed in the system.

In FIG. 5, one of the Switching Units 122 has been represented by a block diagram of its major components. These include: an Address Decoder 198; a Control Switch 200; and, a Data Switch 202. They are connected to a Device 120 via a Device Bus 204 and a Matching Amplifier 206. Each bus 204 has as many Switching Units 122 connected to it as there are converters in the system.

Each Address Decoder 198 consists of a multi-bit AND gate which is energized to activate its Control Switch 200 when the proper combination of signals appears on the individual conductors of the Converter Bus 118 to identify the particular Device Switching Unit 122 being addressed. The Control Switch 200 is a system of AND gates on control lines to the buses and components indicated in FIG. 5; and, the Data Switch 202 is a combination of AND gates energized by signal levels, timing function pulses, etc., as shown in FIG. 4 and described above under the description of the Main Bus Transfer Operation, to control the flow of data in both directions between the Converter Bus 118 and the Device Bus 204. As mentioned previously, in the block diagram of FIG. 5 the heavy connecting lines indicate channels of parallel conductors to accommodate multi-bit transfer of simultaneous signals for data flow, decoding functions, etc. The lighter lines indicate single conductors for gating signals etc. The particular function of the various lines to and from the Control Switch is apparent from the descriptions of the various blocks concerned.

The operation of the Device Switching Units 122 is logically divided into three functions. These are:

(1) The decoding of the address appearing on the Converter Bus lines and the generation of a gating signal which connects the selected Device 120 to the requesting Converter 124.

(2) The gating of appropriate control information between the Device 120 and the Converter 124. This information includes starting signals to the device and synchronizing signals to the converter.

(3) The gating of data flow between the Converter 124 and the selected Device 120.

The function of addressing a particular Device 120 is accomplished by sending the proper combination of pulses over the six line input to its Address Decoder 198 to provide an activation signal from the decoder to the Control Switch 200. Upon the receipt of such a signal, the Control Switch establishes connection between lines 9-16 of the particular Converter Bus 118 which has addressed its Device 120 and the Transfer Bus 204 of this device. The Control Switch 200, also, indicates to the Data Switch 202 whether the Device 120 addressed is to perform an input or output operation. This Data Switch is comprised of eight channels connecting the Input-Output Device 120 to conductor 1-8 of the Converter Bus 118. These channels are capable of data flow in either direction, depending upon whether they have received an input or output control signal from the Switch 200.

The Matching Amplifier 206 amplifies the signals passing to and from the Device 120 and matches the impedance of the device to that of the Switching Unit 122.

*Operation of the input-output system.*—The operation of the Input-Output System is best illustrated by describing in sequence the events that take place in the performance of an Input-Output Instruction.

*Input*

When an Input Instruction is read out of memory it is initially transferred to the Instruction Word Register 126 of the central machine and the Internal Registers 150-156. A test is then made to determine the state of the particular Input-Output Device 120 addressed by the instruction. If that device is in use, computation is halted by λ being set to one, in the manner explained under Timing above, to hold the machine at the particular Timing Function TF-1-8 at which it is currently operating until the device is released. When the device is ready, a Converter 124 is selected and the Input-Output Order along with some control information is transferred to that converter.

The selection of a converter is automatic and is governed by an iterative circuit, located in the Control System 130, which senses the converters in a fixed sequence and selects the first one which is free. If all converters are busy, the operation of the basic cycle is held up again by setting λ to one in a manner similar to that explained immediately above for the situation when a particularly addressed Input-Output Device is unavailable.

The thirty-six bit Instruction Word, when it is transferred to a Converter 124, is stored in the following registers:

Digits 1–15 are transferred to the Address Counter Register (ADC) 178;

Digits 16–21, to the Device Address Register (DAR) 176;

Digits 22–30, to the Word Block Counter (WBC) 174; and,

Digits 31–36, to the Converter Instruction Storage Register (ISR) 172.

The control information, which is processed by bits 31–36 through the ISR Register 172 to the Converter Control System 170, operates through a combination of sensing and control flip-flops and their associated circuitry to determine whether the order received is compatible with the type of Input-Output Device 120 which has been addressed. It also provides for auxiliary features such as: interpreting sign; determining whether the computed is to halt upon the incidence of input errors or ignore them; determine whether the Device 120 addressed is an input device or an output device; determine whether the Device 120 addressed is a magnetic tape; etc.

If the order received is compatible with the type of input-output device addressed, the converter initiates execution of the input-output instruction. If it is not compatible the computer is halted.

The first step in the execution of the order is the selection of the Input-Output Device 120. To accomplish this, the Device Address Register (DAR) 176 drives the six converter bus lines connected to the Address Decoders 198 of all the Device Switching Units 122 with the particular combination of pulses which comprise the address of the desired Device 120. The Decoder associated with the addressed device thereupon provides a gating level which initiates through its Control Switch 200, as explained above under the heading Device Switching Units, the transfer of the appropriate control information between the Converter and the Device. At this point, control of the actual data transfer is taken over by synchronizing signals generated from the data itself in the TAR Auxiliary Buffer, in the manner explained above. During an Input Instruction, the direction of the flow of data, i.e. character transfer from the Input-Output Device 120 to the Converter 124, is as follows: through Data Switch 202 in Device Switching Unit 122; over conductors 1–8 in the Converter Bus 118 through the TAR 180, BXR 182, BSR 184, and CIR 186 Registers in sequence. After the character is transferred into the CIR Register, it may be checked for parity. It may also be sensed for special control symbols and checked for parity in the TAR Register 180.

Now, under Converter control, the six data bits are transferred from the CIR Register 186 to the six low-order positions of the Buffer Register 188. This register is then shifted six digits to accomodate the next character. When a complete word is assembled in the thirty-seven bit Buffer Register by six input shifting operations, the Control Bit Flip-flop 194 is set by the Counter 192 in the manner previously dscribed and Priority Circuit 196 provides for the Gate 190 to connect Buffer 188 with the Main Transfer Bus 100 and thereby gives it access to a location in memory, or one of the Internal Registers addressable from the Main Bus 100.

The particular location to which the word assembled in Buffer 188 is transferred is designated by the contents of the Address Counter (ADC) 178. The original Input Instruction provided the address of the location in memory in which the first complete word resulting from the instruction was to be stored. This address, designated by the first fifteen bits of the Instruction Word, was transferred into the Address Counter. After each transfer of a word from Buffer 188 to memory the contents of this counter is augmented by one to provide the address for the next word.

*Output*

At the initiation of an output instruction, the Control Bit Flip-flop 194 is set to the proper condition to cause the Priority Circuit 196 to enable Gate 190 to connect Buffer 188 to the Main Transfer Bus 100 when the buffer is cleared and in condition to accept a word from the central machine. After the output word is transferred into Buffer 188, the six high-order digits are re-transferred to the CIR Register 186 which makes a parity check on this particular character. Then, in response to synchronizing signals from the output device, the contents of the CIR Register 186 is transferred through the BSR 184 and BXR 182 Auxiliary Buffer Registers to the TAR Register 180, and over the Converter Bus 118 to the particular Device 120 concerned.

This six digit at a time shifting process is repeated until the Buffer Register 188 is emptied. Whereupon, the Counter 192 will have reset the Control Bit-Flip-flop 194 so that the Priority Circuit 196 and Gate 190 can provide for another word to be transferred into the Buffer Register 188 and processed to the Output Device 120. It is to understood that, after transfer of a word into Register 188, Gate 190 is closed until reopened by this counting of the number of shift pulses required to empty the register.

As explained above, the actual input and output processing of data and access to memory are independent of the operation of the Arithmetic Unit 109, and asynchronous with the rest of the machine unitl the Control Bit-Flip-flop 194 initiates a transfer to memory. Normally, the Control Bit is sensed once every basic cycle. On long instructions, however, such as multiply and divide, shifting etc., it is sensed more frequently.

*Real time system*

The real time input-output system of the computer provides for immediate response to and control of external operations, interrogations, etc. It serves as a temporary buffer for asynchronous external data and permits it to be fed into the computer system automatically as soon as it is generated. It also provides output indications in the form of control signals, displays, etc. in immediate response to variable conditions.

FIG. 6 shows a block diagram of the input and output components of the Real Time System. These include: a Real Time Input Register 134, a Real Time Output Register 136, and Terminal Equipment 138 such as the Transmitter 208 and the Receiver 210 of a communications channel. The Input Register 134 is connected to the Main Transfer Bus 100 through a Gate 212 under control of the Priority Circuit 196 which has been described above with reference to the Converter System. It is also connected through a Program Interrupt Circuit 214, associated with the final stage of the Register 134, to the Central Control 130 of the entire computer system. This permits real time interruption of the normal input cycle of the computer to introduce an input signal of the proper priority. The Output Register 136 is connected through a Control Bit Counter 216 to a Gate 218 which controls the flow of data from the main Transfer Bus 100 to the register.

*Input.*—Upon receipt of an appropriate signal at the Receiver 210, the real time input system functions as follows to process data into the central machine via the Main Tranfer Bus 100. Data arriving at the Receiver 210 generates a strobe pulse over Line 220 to the Input Register 134. When this register is clear to receive data, a responding ready pulse is transmitted back to the Receiver 210 over Line 222. Upon receipt of this ready signal, the receiver transmits to the Register 134 its data in the form of successive six bit frames.

These frames are shifted six stages at a time through the forty-two stage Register 134 until it has been completely loaded. The first frame of any sequence includes instruction digits for the data which is to follow. One of these digits is known as the program interrupt instruction and the other as the control bit. The control bit will always be an affirmative signal. When it has been shifted to its final stage, e.g. the forty-first in the forty-two bit Register 134, an appropriate connection 226 to the Priority Circuit which controls Gate 212 causes the data in the first thirty-six stages of the register to be transferred to conductors 1–36 of the Main Transfer Bus 100, automatically, upon completion of the current instruction. This happens in the same manner as explained above with reference to Gate 190 in the Converter System.

The location within the central machine to which data may be thus transferred is determined by the contents of the Real Time Address Register 132 (see block diagram, FIG. 1). The contents of this register are originally set by the Real Time Input Instruction and automatically indexed after each access to memory from the Real Time Input Register to allocate subsequent addresses without waste of programming time. They are not indexed if the access is to one of the addressable Internal Registers 150–156 instead of an address in one of the Memory Units 102–1 etc.

*Program interrupt.*—If the proper signal is inserted by the incoming data in the program interrupt position, e.g. a one in digit #6 of the first six processed into Register 134, the arrival of this signal after the seventh shift at stage 42 which forms a part of circuit 214 will transmit an indication to the Central Control 130 of the entire computer system (as shown in FIG. 6), and thus interrupt the main program to process the priority data indicated. This interruption takes place immediately upon completion of the current instruction or during the computation period of longer instructions, e.g. multiply and divide, and takes precedence over other input indications to the Priority Circuit 196. Also, if the instruction it introduces so indicates, it may immediately initiate a new program.

*Output.*—When a program instruction indicates that data is to be transferred out of the central machine through the real time output system, a Control Bit Flip-flop 218 is sensed by the Central Control 130 to determine whether the Output Register 136 is clear to receive data. When the Register 136 is clear, data is processed into this register from the Main Transfer Bus 100 a full word at a time. When the Register 136 is thus loaded it sends a strobe pulse over Line 230 to the Transmitter 208 of the Terminal Equipment 138. If the transmitter is ready to handle the data, a ready signal is returned over Line 232. Upon receipt of such a signal the Register 136 shifts its data out, six digits at a time over the six Channel Data Link 234, to the Transmitter 208. The Control Bit Counter 216 is pulsed for each shift of the Register 136; and, after the sixth pulse is received, it indicates by resetting the Control Bit Flip-flop 218 that the Register 136 is ready to accept more data.

In this manner the real time input-output system is capable of direct response to and control of external devices and operations. It directs the transmission and reception of data to or from remote locations where on-line controls may be monitored and effected, interrogations may be initiated, etc. Also, it is possible to connect two computer systems of the type described back to back by cross linking their respective Receiver 210 and Transmitter 208 units, so that one computer may communicate with another at either local or remote locations.

BASIC CYCLE AND OVERLAP OF INSTRUCTIONS

Since this is a synchronous machine, its operation in performing the instructions of a program may be best described and understood by reference to a basic cycle. For purposes of the present description, this basic cycle is subdivided into eight steps or periods corresponding to the Timing Functions TF-1-8 produced by the Timer 148 and described above under the title TIMING. Each period is normally 2 microseconds in duration, providing a basic cycle duration of 16 microseconds. For instructions that require a longer period of time, e.g. multiplication, division, etc., any of the eight timing functions can be extended in the manner described with reference to the $\lambda$ flip-flop under the heading Timing above. This extends the Timing Function concerned until the operation is completed.

The operations that occur during a basic cycle can be separated into two classes. The first class consists of those which occur specifically for execution of the particular instruction being performed. The second class of operations, referred to as basic cycle operations, is common to all instructions. It includes the instruction and operand accesses to memory and a group of additional control functions required for proper sequencing of the computer through its basic cycle.

A special feature of the machine under description is that these two classes of operations are overlapped in time, i.e. carried on simultaneously, through a specialized use of the Instruction Register 126 with a resulting economy of operational time. The following description will explain how Register 126 provides storage for the instruction word immediately after it has been extracted from memory thereby making it possible for both the instruction and operand accesses to memory of the current instruction to take place, while the previous instruction is being executed.

The sequence of events involved in the selection and execution of a typical instruction is as follows:

The contents of the Program Counter 140 are transferred via the Main Transfer Bus 100, to a Memory Address Register 106.

The instruction specified by the particular address is extracted from memory and sent in respective portions to the Address Register 150, the X Register 152, the G Register 154, and the Instruction Register 126. This step comprises the instruction access to memory.

The contents of one of the four Index Registers, if this step is specified in the instruction, are then added to the address portion of the contents of the Address Register 150.

The address thus modified is sent back to the specified Memory Address Register 106 to initiate the operand access to memory.

The operand is extracted from the specified address in memory and placed in the memory In-Out Register 104. Then, the operational code of the instruction is transferred from the Instruction Register 126 to the Decoder 128 to initiate execution of the Instruction.

While execution of this instruction proceeds, the next instruction and operand accesses to memory occur in the manner just described to commence performance of the next program order.

The preceding sequence of events may be related to the timing functions of the basic cycle in the following manner:

(It will be assumed that while a present instruction is being processed by this basic cycle, commencing at TF-4, an addition operation called for by the preceding instruction is being executed.)

TF-1—The operand of the preceding instruction arrives at the Memory Output Register 104.

TF-2—This operand is rewritten into the memory address from which it was extracted and simultaneously transferred from the Memory Output Register 106 to the B Register 110 of the Arithmetic Unit.

TF-3—If the signs of the contents of the A and B Registers in the Arithmetic Unit are alike, the contents of B are added to the contents of A. If their signs are different, the ones complement of B is formed, and $B+1\times 2^{-36}$ is added to A.

TF-4—The contents of the Program Counter (identifying the present instruction) are transferred to the Memory Address Register 106 and a read pulse is transmitted to the Memory System 102. Simultaneously, to further execute the addition of the proceding instruction, if B was complemented and there was no overflow, the ones complement of the contents of Register A is formed and its sign reversed. If the contents of B were not complemented and there was an overflow, the overflow alarm flip-flop is set.

TF-5—The present instruction arrives at the Memory Output Register 104 from the address in memory specified by the contents of the Program Counter 140. Simultaneously, to complete execution of the addition ordered by the previous instruction, if the contents of Register B complemented and there was no overflow $1\times 2^{-36}$ is added to the contents of Register A.

TF-6—Appropriate portions of the contents of the Memory Output Register 104 are transferred to the Address Register 150, the X Register 152, the G Register 154, and the Instruction Register 126. Also, the instruction is rewritten into the Memory Output Register 104.

TF-7—The Program Counter is stepped, and the contents of the particular Index Register 157 specified by the gamma address, if required by the instruction, are added to the Address Register 150.

TF-8—The contents of the Address Register 150 are transferred to the Memory Address Register 106, a read pulse is transmitted to the Memory System 102, and the contents of the Instruction Register 126 are transferred to the Decoder 128. This puts the machine into condition to execute the instruction just processed and repeat the basic cycle as described above.

The invention has been described as incorporated into a specific computer system. It is, of course, understood that it is not limited to the particular computer or class of equipment described, and may be incorporated into other types of electronic data processing systems.

To prevent undue burdening of the description with matter within the ken of those skilled in this art, a block diagram approach has been followed, with a detailed functional description of each block and specific identification of the circuitry it represents. The individual engineer is free to select elements and components such as flip-flop circuits, shift registers, etc. from his own background knowledge or available standard references, such as Arithmetic Operations in Digital Computers, by R. K. Richards (Van Mostrand Publishing Co.); and, Pulse and Digital Circuits, Millman and Taub (McGraw-Hill). Also, a description of the system may be found in an article entitled "System Organization of Mobidic," by John Terzian, in the IRE Wescon Convention Record, Part IV, page 78, which may be considered to be incorporated by reference into this description.

The term "Converter" as used with reference to block 124 (FIG. 1) throughout this description, and in the following claims, means that portion of an Input-Output System which functions between Input-Output Devices and the central machine to control, buffer, or change the code structure of data flowing between them.

What is claimed is:

1. For electronic data processing equipment, an input-output system which comprises: a plurality of input-output devices; a plurality of converter units; a converter bus including a plurality of multi-line conductor groups corresponding to the number of and independently connected to a respective one of said converters; and, a separate device switching unit connecting each one of said devices to each separate one of said conductor groups.

2. The invention according to claim 1 wherein each of said devices is connected to all of its associated switching units by means of a common multi-conductor bus.

3. The invention according to claim 1 and wherein said converters each comprise: a control unit; a shifting register main buffer unit; at least one instruction storage register connected between said main transfer bus and said control unit; a device address storage register connected between said main transfer bus and said converter bus; a data delay circuit connected between said main transfer bus and said converter bus; a gating circuit controlling the flow of data from said main buffer to said main transfer bus; a counter circuit; a control circuit connected in response relationship to said counter and control relationship to said gating circuit; and, means connected to said control unit for controlling the transmission of data into and out of said delay circuit, the shifting of said buffer register, and the stepping of said counter to count said shifting operations.

4. The invention in accordance with claim 3 wherein said delay circuit incorporates means for synchronizing the operation of said control unit with the reception of data from said converter bus.

5. The invention according to claim 1 wherein said device switching units each comprise: an address decoder; means for transferring data between one of said devices and one of the conductor groups of said converter bus; and, means responsive to said address decoder for controlling said data transfer.

6. For electronic data processing equipment, an input-output system comprising: a plurality of data input-output devices; a plurality of separate input-output connector buses; means for selectively connecting each one of said devices in data transfer relationship to any one of said buses; and, a plurality of device converters, a separate one of said converters being connected in data transfer relationship to a corresponding separate one of said buses, whereby any one of said converters may be selectively connected in data transfer relationship over its respective bus to any one of said devices and disconnected from all other ones of said devices, and a plurality of said converter-device connections may be established simultaneously.

7. For an electronic data processing system wherein a plurality of system components are connected in data transfer relationship to a system data bus, system input-output apparatus comprising: a plurality of data input-output devices; a plurality of device converters each comprising a buffer storage register arranged to process data in a given number of operational steps, and a counter operated in synchronism with said data processing for counting said steps; means for selectively connecting each one of said converters in data transfer relationship to said system bus; a plurality of input-output data buses, each connected in data transfer relationship to a separate one of said converters; and, means for selectively connecting any one of said devices in data transfer relationship to each one of said input-output buses.

8. For an electronic data processing system arranged to process a digital data word in binary bit format over a system bus having a plurality of parallel conductors individually corresponding to individual bit positions of said data word, a data input-output subsystem comprising: a plurality of data input-output devices, each capable of processing a multi-bit data word; a plurality of input-output data transfer buses; a plurality of device switching units connected in data transfer relationship between said devices and said input-output buses, a separate one of said units corresponding to each separate connection between a device and a bus, and each one of said devices being separately connected to each one of said buses; a plurality of device converters, each connected in data transfer relationship between a corresponding one only of said transfer buses and said system bus; means for selectively energizing individual ones of said converters; and, means for selectively activating individual ones of said switching units to establish data transfer relationship between a selected input-output device and said system bus via an activated converter.

9. The invention according to claim 8 wherein each of said converters is arranged to process a multi-bit input-output instruction word including an operational code series of digits, an input-output device addressing series of digits, a memory address series of digits and a device operation counter series of digits, and each comprises: a first decoding register for said operational code digits; a second decoding register for said device addressing digits; a first counter-register for said memory address digits; and, a second counter-register for said device operation counter digits, whereby said converters are arranged to maintain connections, via said second decoding register while the data content of said first decoding register is altered.

10. The invention according to claim 8, wherein each of said input-output devices is separately addressable by means of a first multi-bit series of binary digits of an input-output instruction word derived from said system bus through one of said converters and is operated in accordance with a second multi-bit series of binary digits similarly derived, and said device switching units each comprise: a first multi-stage decoding register arranged to process said first binary series to energize its corresponding device in response to a given combination of digits in said first series; and, a second multi-stage decoding register arranged to control the operation of said device when so energized.

11. The invention according to claim 10 wherein said converters each include a buffer storage register for data in transfer between said system bus and said input-output bus.

12. The invention according to claim 11 wherein: data is processed through said buffer in a given number of operational steps; and, a counter operated in synchronism with said data processing is provided to count said steps.

13. The invention according to claim 12 wherein a gating circuit is provided between said buffer register and said system bus, said gating circuit being connected to said counter and arranged to permit data transfer when said counter bus has achieved a given count.

14. The invention according to claim 13 wherein a separate ready-to-transfer signal circuit is connected to the respective counter of each of said converters and a common data transfer control circuit is connected to all of said signal circuits, said transfer control circuit being arranged to control the gating of data between the buffer registers of said converters and said system bus.

References Cited by the Examiner

UNITED STATES PATENTS

| 2,781,446 | 2/57 | Eckert | 235—61 |
| 2,845,609 | 7/58 | Newman | 235—61 |
| 2,850,234 | 9/58 | Bartelt | 235—61 |
| 2,872,666 | 2/59 | Greenlalgh | 235—61 |
| 2,885,659 | 5/59 | Spielberg | 235—152 |
| 2,946,044 | 7/60 | Bolgiano et al. | 340—172.5 |
| 2,951,234 | 8/60 | Spielberg | 340—172 |

OTHER REFERENCES

Pages 11, 21 to 26, 28 to 36, 189 to 196—1952, "Description of a Magnetic Drum Calculator," by the Staff of the Harvard Computation Laboratory, Harvard University Press.

MALCOLM A. MORRISON, *Primary Examiner.*

WALTER W. BURNS, JR., EVERETT R. REYNOLDS,
*Examiners.*